United States Patent
Pattison et al.

(10) Patent No.: US 11,079,288 B2
(45) Date of Patent: Aug. 3, 2021

(54) ANALYSIS OF CALORIMETRY MEASUREMENTS

(71) Applicant: Malvern Panalytical Inc., Westborough, MA (US)

(72) Inventors: Benjamin Edward Pattison, Westborough, MA (US); Kenneth Haber, Westborough, MA (US); Mark Arsenault, Westborough, MA (US)

(73) Assignee: Malvern Panalytical Inc., Westborough, MA (US)

( * ) Notice: Subject to any disclaimer, the term of this patent is extended or adjusted under 35 U.S.C. 154(b) by 7 days.

(21) Appl. No.: 16/484,685

(22) PCT Filed: Jan. 31, 2018

(86) PCT No.: PCT/US2018/016291
§ 371 (c)(1),
(2) Date: Aug. 8, 2019

(87) PCT Pub. No.: WO2018/151940
PCT Pub. Date: Aug. 23, 2018

(65) Prior Publication Data
US 2020/0158581 A1 May 21, 2020

Related U.S. Application Data

(60) Provisional application No. 62/458,944, filed on Feb. 14, 2017.

(51) Int. Cl.
*G01N 25/00* (2006.01)
*G01K 17/00* (2006.01)
*G01N 25/48* (2006.01)

(52) U.S. Cl.
CPC ....... *G01K 17/006* (2013.01); *G01N 25/4866* (2013.01)

(58) Field of Classification Search
USPC .................................................. 374/31–42
See application file for complete search history.

(56) References Cited

U.S. PATENT DOCUMENTS

| | | | | |
|---|---|---|---|---|
| 5,813,763 A | * | 9/1998 | Plotnikov | G01N 25/4866 374/11 |
| 2011/0301860 A1 | * | 12/2011 | Chaires | G01N 33/54373 702/19 |
| 2015/0019157 A1 | | 1/2015 | Denner et al. | |

OTHER PUBLICATIONS

DSC 2920 Differential Scanning Calorimeter User Manual, TA Instruments (Year: 1997).*

(Continued)

*Primary Examiner* — Lisa M Caputo
*Assistant Examiner* — Nasir U. Ahmed
(74) *Attorney, Agent, or Firm* — Morrison & Foerster LLP

(57) ABSTRACT

A method determining a degree of similarity between a first sample and a second sample, comprising using a processor to compare a first thermogram and a second thermogram, each obtained by performing scanning calorimetry on a first and second sample respectively, by: determining a smoothed first thermogram and a smoothed second thermogram by respectively performing a smoothing operation on the first thermogram and the second thermogram; determining a processed first thermogram and a processed second thermogram by respectively finding a derivative of the smoothed first thermogram and the smoothed second thermogram; determining the degree of similarity from a correlation operation comparing the processed first thermogram with the processed second thermogram.

17 Claims, 4 Drawing Sheets

(56) References Cited

OTHER PUBLICATIONS

Bouzidi et al. (2005), "Use of First and Second Derivatives to Accurately Determine Key Parameters of DSC Thermographs in Lipid Crystallization Studies", Thermochimica Acta 439:94-102.

Bruylants et al. (2005) "Differential Scanning Calorimetry in Life Science: Thermodynamics, Stability, Molecular Recognition and Application in Drug Design," Current Medicinal Chemistry 12: 2011-2020.

Da Silva et al. (2016) "Compatibility Study Between Atorvastatin and Excipients using DSC and FTIR," Journal of Thermal Analysis and Calorimetry 123: 933-939.

Diem et al. (2000) "Strategies for Analysis of Infrared Tissue Mapping Data and Applications to Liver Tissue", Infrared Spectroscopy of Human Cells and Tissue VIII; pp. 282-290.

Falconer et al. (2011) "Analytical Strategies for Assessing Comparability of Biosimilars," Journal of Chemical Technology and Biotechnology 86: 915-922.

Helm et al. (1991) "Classification and Identification of Bacteria by Fourier-transform Infrared Spectroscopy" Journal of General Microbiology 137: 69-79.

International Search Report and Written Opinion dated Mar. 28, 2018, directed to International Application No. PCT/US2018/016291; 13 pages.

Jelesarov et al. (1999) "Isothermal Titration Calorimetry and Differential Scanning Calorimetry as Complementary Tools to Investigate the Energetics of Biomolecular Recognition," Journal of Molecular Recognition 12: 3-18.

Rinnan et al. (2009) "Review of The Most Common Pre-processing Techniques for Near-infrared Spectra", Trends in Analytical Chemistry 28 (10): 1201-1222.

\* cited by examiner

ANALYSIS OF CALORIMETRY MEASUREMENTS

REFERENCE TO RELATED APPLICATIONS

This application is a national stage application under 35 USC 371 of International Application No. PCT/US2018/016291, filed Jan. 31, 2018, which claims priority to U.S. Provisional Application No. 62/458,944, filed Feb. 14, 2017, the entire contents of each of which are incorporated herein by reference.

FIELD OF THE INVENTION

The present invention relates to calorimetry, and more specifically to a method of comparing results obtained from calorimetry to determine similarity (e.g. biosimilarity).

BACKGROUND OF THE INVENTION

Calorimetry is the measurement of heat flows from a body, for example to investigate the temperature and/or energy associated with a phase change (e.g. from liquid to solid), chemical change (e.g. oxidation), or physical change. Microcalorimeters measure small heat flows, and may be used in fields of biochemistry, pharmacology, cell biology and others.

Calorimetry provides a direct method for measuring changes in thermodynamic properties of biological macromolecules. Differential microcalorimeters are twin cell instruments in which properties of a test substance in a sample cell are continuously compared to an equal quantity of a reference substance in a reference cell. For protein measurements, the test substance may be dissolved in an aqueous buffer in the sample cell, and reference substance may consist of the aqueous buffer (without the test substance). Differences in the amount of heat required to change the temperature of the sample cell compared with the reference cell can be attributed to the test substance.

SUMMARY OF THE INVENTION

In differential scanning calorimetry (DSC) the temperature of the sample cell may be changed at a given rate while monitoring the temperature differential or heat flow between the sample and reference cells. From the temperature differential/heat flow information, small differences in the heat capacities between the sample cell and the reference cell can be determined and attributed to the test substance.

In an alternative form of DSC (sometimes referred to as differential thermal analysis) heat flow to the sample cell and reference cell is controlled, so that heat is applied at the same rate to both the sample and reference cell, and the resulting temperature differences are monitored.

The difference in heat flow between the sample and reference cell determined from DSC can be used to determine a partial specific heat capacity $c_p(T)$ of the test substance. This partial specific heat capacity can, in turn, be used to derive information about the test substance.

A transition in state will lead to a peak in the heat capacity of the test substance, centred on the transition temperature $T_m$. Integration of the partial heat capacity over the peak will yield the transition enthalpy $\Delta H$. The sharpness of the transition peak can be determined, for example from the width of the peak at half-peak height, providing an index of the cooperative nature of the transition (highly cooperative transitions having narrow peaks). A change in the specific heat capacity associated with the transition may also be determined from a change in baseline of the partial heat capacity after the peak.

Multiple state transitions may be recorded in a single set of measurement data (or thermogram). For example, transitions associated with melting, denaturation and folding may occur, each of which can be characterised by the parameters already discussed. These transitions may overlap, resulting in complex heat capacity profiles, so deconvolution analysis may be used to determine the underlying physical parameters that fit the data best.

Brief reviews of DSC in life science and biomolecular analysis are provided in Jelesarov, Ilian, and Hans Rudolf Bosshard. "Isothermal titration calorimetry and differential scanning calorimetry as complementary tools to investigate the energetics of biomolecular recognition." Journal of molecular recognition 12.1 (1999): 3-18. and Bruylants, Gilles, Johan Wouters, and Catherine Michaux. "Differential scanning calorimetry in life science: thermodynamics, stability, molecular recognition and application in drug design." Current medicinal chemistry 12.17 (2005): 2011-2020.

It is often useful to compare one test substance with another. One example is in biosimilar pharmaceuticals. Biosimilars are copies of an existing biopharmaceutical product (already subject to regulatory approval as a medicine) which seek approval for the same medical use on the basis that they are sufficiently similar to the already approved product. An exact copy is generally not possible without access to the originator's manufacturing assets and know-how, and considerable effort may be required to a produce sufficiently similar product. A wide range of analytic tools are used to assess similarity during the development process, including DSC (for a review, see Falconer, Robert J., Dianne Jackson Matthews, and Stephen M. Mahler. "*Analytical strategies for assessing comparability of biosimilars*" Journal of Chemical Technology and Biotechnology 86.7 (2011): 915-922.)

At present when one substance is compared with another by DSC, parameters that are derived from the thermogram are used to do so: for example, the transition temperature $T_m$, total energy of unfolding, or the temperature associated with the onset of a transition. It can be difficult to determine how to weight these parameters in a comparison. Furthermore, each parameter may be subject to some uncertainty in measurement due to the way it is derived (e.g. as a result of a noisy thermogram).

An improved method of comparing thermograms (obtained by DSC) obtained from different test substances is desirable. An improved comparison for indicating a degree of biosimilarity between the test substances would be very useful in developing biosimilar pharmaceuticals.

According to a first aspect, there is provided a method determining a degree of similarity between a first sample and a second sample, comprising using a processor to compare a first thermogram and a second thermogram, each obtained by performing scanning calorimetry on a first and second sample respectively, by:

determining a smoothed first thermogram and a smoothed second thermogram by respectively performing a smoothing operation on the first thermogram and the second thermogram;

determining a processed first thermogram and a processed second thermogram by respectively finding a derivative of the smoothed first thermogram and the smoothed second thermogram;

determining the degree of similarity from a correlation operation comparing the processed first thermogram with the processed second thermogram.

Finding the derivative may comprise finding a second derivative.

Performing the smoothing operation may comprise performing Savitzky-Golay smoothing.

The steps of finding a smoothed first and second thermogram and of determining a processed first and second thermogram may be combined into a single operation. For example, a Savitzky-Golay $2^{nd}$ derivative filter/function (or a Savitzky-Golay $1^{st}$ derivative filter/function) may perform both steps in a single operation.

The Savitzky-Golay smoothing may utilise cubic polynominal fits. The window size of the Savitzky-Golay filter may be between 5 and 100, or between 10 and 65. The window size may be selected to correspond with a temperature range. The temperature range of the window size may be between 0.1 and 1 degrees C., or between 0.5 and 2 degrees C.

Performing the smoothing operation may comprise finding a moving average.

Performing the correlation operation may comprise determining a Pearson correlation between the processed second thermogram and the processed first thermogram.

Performing the correlation operation may comprise determining a Pearson distance between the processed first thermogram and the processed second thermogram.

The method may further comprise the step of determining the first thermogram and/or second thermogram by calorimetry.

The step of determining the first thermogram and/or second thermogram may comprise performing a differential scanning microcalorimetry measurement.

The first and second sample may comprise a candidate biopharmaceutical—for example, the second sample may comprise a target biopharmaceutical, and the first sample may comprise a candidate biosimilar.

The degree of similarity may be a degree of biosimilarity.

Determining a degree of similarity from a correlation operation may comprise weighting a result of the correlation operation by a degree of similarity between values of a physical parameter determined from the first thermogram and second thermogram.

The physical parameter may be selected from: a state transition temperature, a state transition enthalpy, and a state transition cooperativity.

The state transition may be: a melting point, a denaturation point or a folding/unfolding temperature, or any change in conformation or Higher Order Structure (HOS).

Determining a degree of similarity from a correlation operation may comprise exponentiating a result of the correlation operation. This may increase a dynamic range of the comparison.

According to another aspect, a machine readable non-transient storage medium is provided, comprising instructions for configuring a computer to perform the method of the preceding aspect.

According to another aspect, there is provided a differential scanning calorimeter operable to obtain a thermogram from a sample, comprising:
 a sample cell,
 a reference cell,
 a thermal shield disposed around the sample cell and the reference cell,
 a cell heater arranged to heat the sample cell and the reference cell,
 a thermal sensor arranged to measure a difference in temperature between the sample cell and the reference cell, and
 a processing system configured to control the cell heater and receive temperature measurements from the sample cell and reference cell, and to determine a first thermogram comprising estimates of heat capacity at each of a range of temperatures for a test substance in the sample cell, the estimates being responsive to a difference in the amount of heat required to maintain the sample cell and reference cell at the same temperature while the temperature of both the sample cell and reference cell is varied,
 wherein the processing system comprises a memory for storing a second thermogram, and the processing system is configured to compare the first thermogram with the second thermogram, by:
  determining a smoothed first thermogram and a smoothed second thermogram by respectively performing a smoothing operation on the first thermogram and the second thermogram;
  determining a processed first thermogram and a processed second thermogram by respectively finding a derivative of the smoothed first thermogram and the smoothed second thermogram;
  determining the degree of similarity from a correlation operation comparing the processed first thermogram with the processed second thermogram.

The cell heater may comprise a sample cell heater for heating the sample cell (e.g. independently of the reference cell) and a reference cell heater for heating the reference cell (e.g. independently of the sample cell).

Features described with reference to one aspect or embodiment may be combined with features of any other aspect of embodiment, either individually (in isolation of the other features of that aspect or embodiment), or with other features.

BRIEF DESCRIPTION OF THE DRAWINGS

Example non-limiting embodiments will now be described in more detail, with reference to the accompanying drawings, in which.

DETAILED DESCRIPTION OF THE INVENTION

Figure 1:
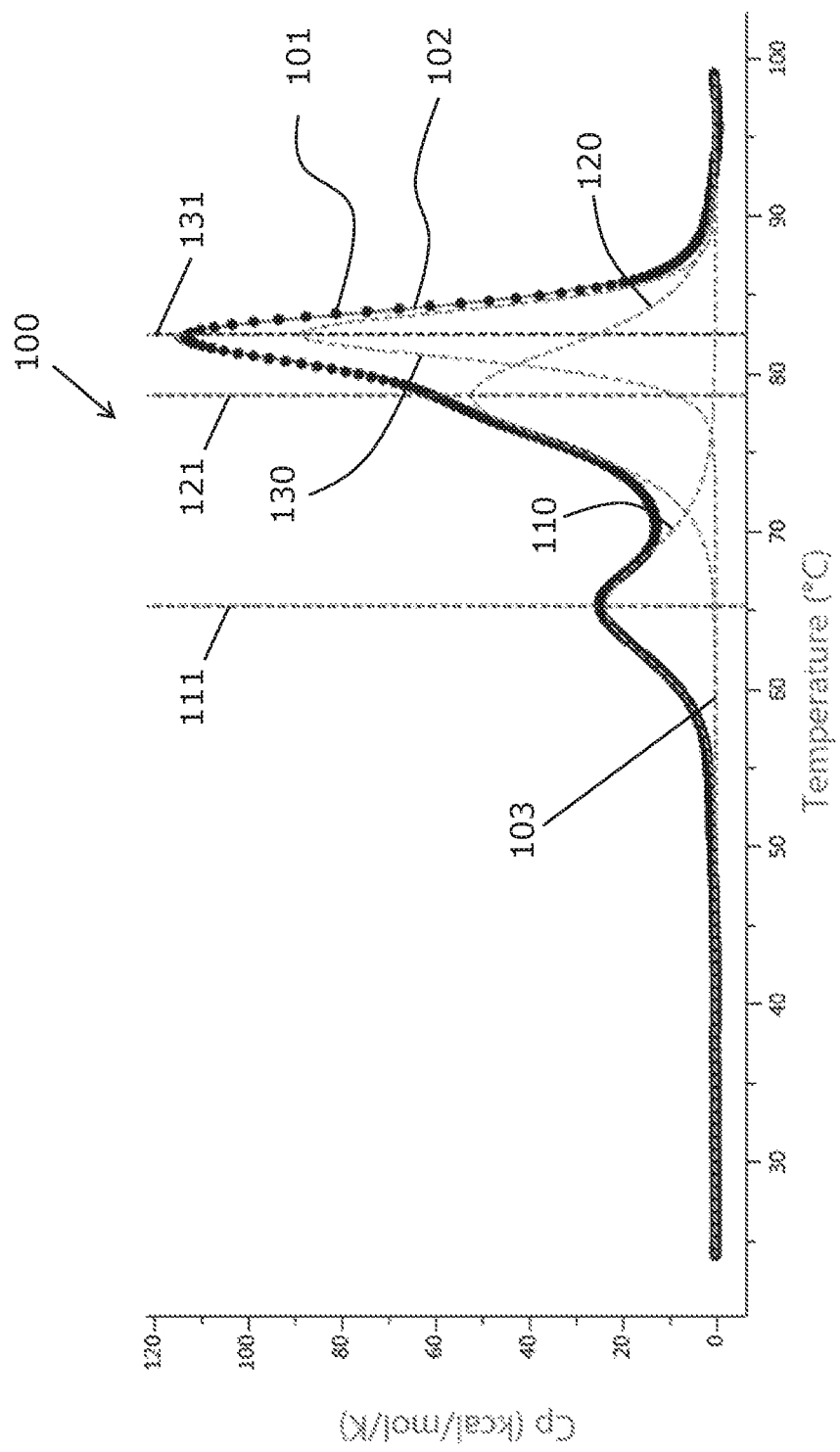
FIG. 1 is a thermogram obtained from a sample, the thermogram including three transitions, illustrating how deconvolution of the three transitions can be performed, and the parameters associated with each transition determined.

Referring to FIG. 1, a graph is shown of specific heat $c_p$ (in kcal/mol/K or 4.184 kJ/mol/K) against temperature (in degrees Celsius) for: raw thermogram data 101, a fit 102 to the raw thermogram data, a first component fit 110 to the first transition, a second component fit 120 to the second transition and a third component fit 130 to the third transition.

The raw thermogram data 101 has two obvious peaks, centred on around 65 degrees C. and 82.5 degrees C. respectively. The latter peak is asymmetric, with a shoulder. As mentioned in Jelesarov, numerical methods can be used to fit a model to the raw data to extract parameters from the thermogram. In this case, an appropriate model is one that has three transitions, illustrated on the graph as separate components of the fit 110, 120, 130. The sum of these three components 102 is a good match for the raw thermogram data 101. It is straightforward to determine the transition temperature 111, 121, 131 respectively associated with each of the three transitions, from the peak of each component 110, 120, 130 of the fit 102. The total enthalpy associated with changing the temperature of the test substance can be determined from integration of the data 101 or the fit 102.

Using this information, the test substance analysed to obtain FIG. 1 can be compared with another substance (for example, a target substance in biosimilarity screening) based on a similar set of results, obtained in the same way, as shown in the below table:

| Name | Cell (M) | Total Area kcal/mole | Tm1 ° C. | Tm2 ° C. | Tm3 ° C. |
| --- | --- | --- | --- | --- | --- |
| Reference | 6.90E−06 | 1050 | 65.2 | 78.5 | 82.4 |
| Test substance | 6.90E−06 | 985 | 64.4 | 78.5 | 82.5 |

Similar comparisons between substances can be made using other quantitative parameters that can be determined from a thermogram, such as transition onset temperatures or the enthalpy of each transition.

Such comparisons, based on quantitative parameter values derived from the thermogram, can mask differences in the substances being compared. For example, if a comparison is made on the basis of transition temperatures ($T_m$), differences in the height of the transitions may be ignored, with the result that energetic differences in the transitions are not taken into account. Including more parameters in a comparison makes it more difficult to easily compare one substance with another, and can lead to inconsistency when different parties use different comparison parameters, potentially with different weighting.

Embodiments of the present invention solve this problem by taking account of all the features of the thermogram in the comparison, and providing a single number that embodies the degree of similarity between the thermograms (and therefore the similarity between the test substance and the target).

Figure 2:
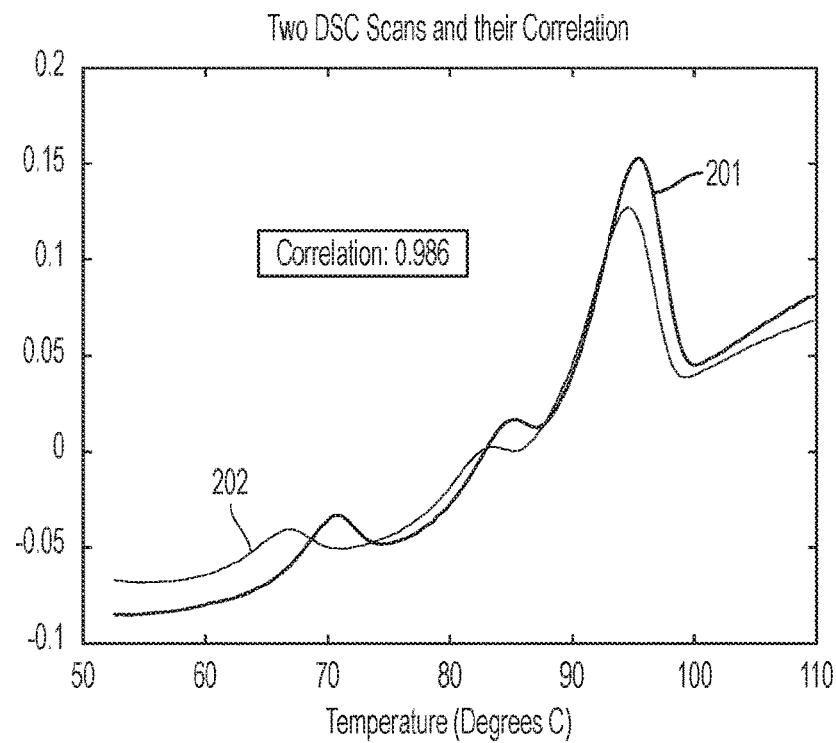
FIG. 2 is graph of two raw thermograms and their correlation.

FIG. 2 illustrates an example in which simple correlation is used to assess similarity between a first thermogram 201 and second thermogram 202 (each thermogram being a plot of $c_p(T)$, obtained by DSC). The baselines of the two thermograms 201, 202 are a relatively close match, showing a background linear increase in specific heat with temperature over the measurement range. There is substantial overlap of the most prominent peak, but the two lower peaks are less well matched, with a significant temperature shift in these peaks between the first and second thermogram 201, 202. The (Pearsons's) correlation coefficient between the two curves 201, 202 is relatively high, at 0.986, mainly due to the fact that the baselines are a relatively close match. Correlation of the raw data tends to give less weight to the mismatch in the lower temperature transitions, while providing too much weight to a match in the baseline.

Figure 3:
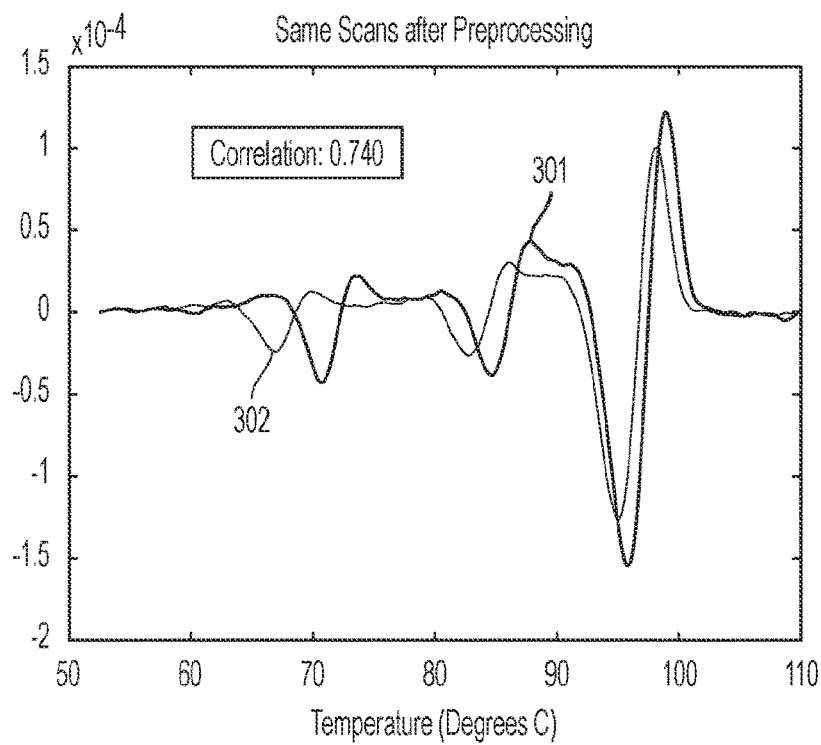
FIG. 3 is a graph illustrating processed versions of the thermograms shown in FIG. 2 and their correlation, the processed versions obtained by applying a Savistky-Golay filter to obtain smoothed thermograms, and obtaining the second derivative of the smoothed thermogram.

FIG. 3 illustrates smoothed and processed data according to an embodiment, in which a Savitsky-Golay filter is used to smooth the data that is shown in FIG. 2, and the second derivative of the smoothed data is obtained, resulting in the processed first thermogram 301 and the processed second thermogram 302. A Savitsky-Golay filter comprises a piecewise polynomial fit to the data, which is straightforward to analytically differentiate, so this method has the advantage of being computationally efficient, at the same time as being robust to noise and outlier points in the data.

Finding the second derivative of the data means that any difference in the baseline of the data is effectively removed—the degree of correlation between the second derivative of the raw data is insensitive to whether the baseline is a good fit, and is instead more strongly dependent on the temperatures associated with the temperatures and shape of the transitions. The (Pearson's) correlation between the first and second processed thermograms 301, 302 is 0.740, which is more representative of the degree of similarity between the materials tested to obtain the first and second thermogram 201, 202.

Figure 4:
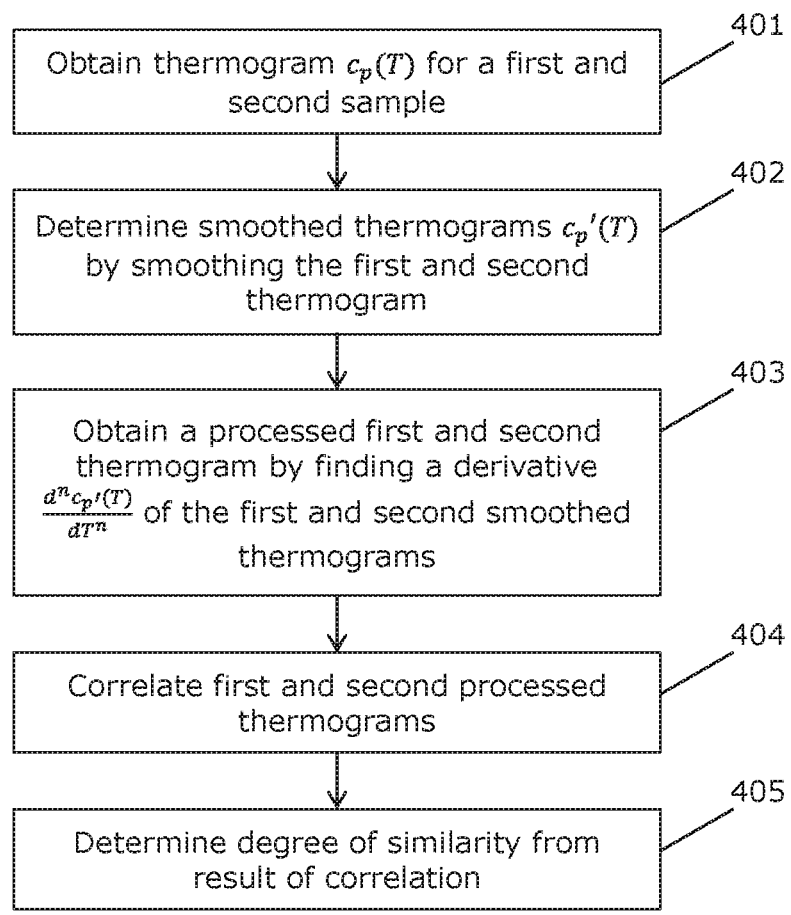
FIG. 4 illustrates a method according to an embodiment.

FIG. 4 illustrates the method schematically, in a flow diagram. In step 401 first and second thermograms respectively from a first and second test substance (or sample) are obtained, for example by performing a DSC measurement, or by receiving or retrieving data derived from a previously performed DSC measurement. A non-limiting example of a differential scanning calorimeter that may be suitable for determining a thermogram for comparison according to an embodiment is described later, with reference to FIG. 5.

At step 402 smoothed first and second thermograms are determined by smoothing the first and second thermogram. Although a Savitsky-Golay filter is a simple and computationally efficient way to obtain a derivative of the data that is robust to noise (because the resulting piecewise polynomial is computationally trivial to differentiate), it will be appreciated that other methods can also be used. A smoothing operation can be performed on the data using any suitable approach, such as a filter based on a: moving average, additive smoothing, digital filter, Kalman filter, low pass filter, smoothing spline filter, etc.

At step 403 a processed first and second thermogram are obtained by finding a derivative of the first and second smoothed thermograms (obtained in step 402). Any appropriate method can be used to determine a derivative of the smoothed data, for example, by direct analytical methods from a smoothing function, or by numerical methods from the smoothed data. It will similarly be understood that steps 401 and 402 can be combined in a single operation, for instance by performing a Savitsky-Golay second order derivative filtering operation, which directly determines the second order derivative that corresponds with a piecewise polynomial fit to the data.

Although a second order differential may be particularly useful for eliminating sensitivity to matching baselines and improving sensitivity to temperature transitions, it will also be understood that other degrees of differential may also be used, depending on the factors that are most important in determining a degree of similarity. For example, in some embodiments a first order differential may be used.

At step 404 the first and second processed thermograms are correlated, for example by determining a Pearson's correlation coefficient. Methods according to an embodiment can be used to produce a reliable scalar number representative of the degree of similarity between a first and second test substance. Although a Pearson's correlation coefficient has been discussed in the example embodiments, it will be understood that other correlations may also be used, for example an adjusted correlation coefficient, weighted correlation coefficient, reflective correlation coefficient, scaled correlation coefficient or Pearson's distance.

In some embodiments, the similarity between the first and second test substance may be weighted by the degree of similarity between a particular parameter that may be deemed to be important (e.g. $T_m$ of a particular transition that has experimentally been determined to be sensitive to biological effect that is of interest). Equally, any other numerical value quantifying a feature of compared thermograms may be used to weight the degree of similarity obtained by performing a correlation on the processed thermograms.

Figure 5:
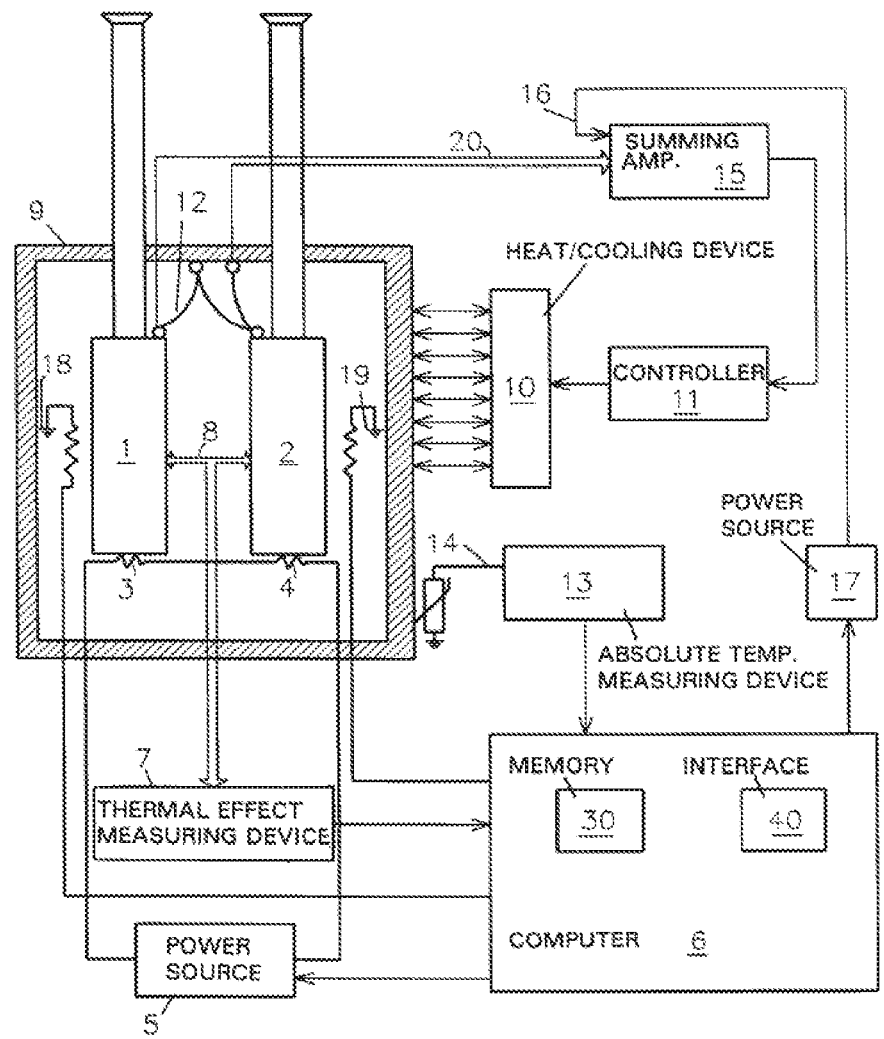
FIG. 5 is schematic diagram of a differential scanning microcalorimeter.

FIG. 5 shows a schematic diagram of a differential scanning calorimeter suitable for determining thermograms for processing according to an embodiment. The DSC comprises two cells, a reference cell 1 and a sample cell 2. The reference cell and sample cell 1, 2 are each identical in volume and mass, and assembled with inlet capillary tubes and matched heating elements 3 and 4. These cells 1, 2 may be of the total-fill type, with the test liquid occupying the entire volume of each cell and capillary tube. In some embodiments, the cells 1, 2 may of the capillary type (which may be appropriate where very small quantities of substance are to be analysed). The heating elements 3 and 4 are driven by a power source 5 which is controlled by a computer 6. The computer includes an interface 40, so that the user may input specifications, and a memory 30 for storage, for example, a hard drive or random access memory. The heating elements 3 and 4 are matched and driven simultaneously by power source 5, so cells 1 and 2 are heated at an identical rate, which is controlled by the computer. The rate at which the temperature of the cells 1, 2 changes is referred to as the scan rate and may be specified by the user through the computer-interface 40.

A thermal effect measuring device 7 is connected to a sensor 8 that measures the difference in temperature between the two cells. Typical sensors include wire thermocouples or semiconducting thermocouples. The temperature differential is measured periodically as the cells are being heated during a scan. The temperature differential data is then sent from thermal effect measuring device 7 to computer 6, where it is saved along with the time of the measurement in the computer memory 30. The cells 1 and 2 are surrounded by a thermal shield 9. During adiabatic operation, the shield helps minimize heat exchange between the cells and their surroundings. The temperature of thermal shield 9 is monitored by an absolute temperature measuring device 13 which is activated by a sensor 14 (typically a platinum resistance thermometer device or RTD) which is mounted on the thermal shield.

Thermal shield 9 is connected to a heating and cooling device 10 (typically an array of Peltier devices) which is operated by a controller 11. The signal to the controller 11 comes from the output of a summing amplifier 15 which receives two inputs. The first input 20 receives its signal from sensor 12 that monitors the difference between the temperature of thermal shield 9 and the average temperature of the two cells 1 and 2. The second input 16 receives its signal from a power source 17 whose output is controlled by computer 6. The output from absolute temperature measuring device 13 is sent to computer 6 and used to determine the appropriate signal to send to power source 17 and subsequently onto the summing amplifier 15. The absolute temperature information is repeatedly stored in the computer memory 30 in conjunction with the temperature differential between cells and the time of the measurement. The operating range for the calorimeter in terms of the temperature at which the cells and shield can be operated may be −20° C. to 150° C., or may be −10° C. to 130° C.

Additional cell heaters 18 and 19 may be located on reference and sample cells 1 and 2, respectively. The power to each of these heaters may be independently controlled directly by the output of computer 6. These cell heaters 18 and 19, which generate only small amounts of heat, and may be used to actively reduce any temperature differential between cells. Through the computer interface 40, the user may be able to select between passive compensation, in which additional heaters 18 and 19 are not used, or various levels (typically low, medium, and high) of active compensation, in which these additional heaters are used by computer 6 to actively minimize the temperature differential between cells 1 and 2. The choice of passive compensation or various levels of active compensation is equivalent to a selection between a number of instrument response times.

In some embodiments, the computer 6 may be configured to process thermograms obtained directly from the DSC measurement arrangement to determine a degree of similarity (as described above). In other embodiments, the comparison described herein may be performed 'offline' on measurements that have already been obtained and stored, for example in a non-volatile storage medium.

Methods according to an embodiment allow the objective comparison of two or more thermograms without recourse to user opinion or bias. Such methods may allow an expert user to set thresholds for acceptance of similarity of samples and to quickly determine unequivocally whether or not a sample is a member of the population of desired samples. This has particular application in fields such as biosimilar development, batch control or internal quality control, or any area where regulatory control or Good Manufacturing Practice, dictates that a process should be without operator bias. This technique may drive the adoption of differential scanning microcalorimetry into such applications or areas of the manufacturing process. Application of DSC in accordance with embodiments of the disclosed method may allow the development of biosimilar therapeutics to be developed more quickly and with reduced cost, as alternative techniques will not need to be designed, tested and proved to provide equivalent information as DSC but with the level of objectivity required, by the FDA for example.

Although example embodiments have been described, the skilled person will appreciate that variations are possible, without departing from the scope of the invention, which should be defined with reference to the accompanying claims.

The invention claimed is:

1. A method of determining a degree of similarity between a first sample and a second sample, comprising using a processor to compare a first thermogram and a second thermogram, each obtained by performing scanning calorimetry on the first and second sample respectively, by:
   determining a smoothed first thermogram and a smoothed second thermogram by respectively performing a smoothing operation on the first thermogram and the second thermogram;
   determining a processed first thermogram and a processed second thermogram by respectively finding a derivative of the smoothed first thermogram and the smoothed second thermogram;
   determining the degree of similarity from a correlation operation comparing the processed first thermogram with the processed second thermogram.

2. The method of claim 1, wherein finding the derivative comprises finding a second derivative.

3. The method of claim 1, wherein performing the smoothing operation comprises performing Savitzky-Golay smoothing.

4. The method of claim 3, wherein the Savitzky-Golay smoothing utilises cubic polynomial fits.

5. The method of claim 1, wherein performing the smoothing operation comprises finding a moving average.

6. The method of claim 1, wherein performing the correlation operation comprises determining a Pearson correlation between the processed second thermogram and the processed first thermogram.

7. The method of claim 1, wherein performing the correlation operation comprises determining a Pearson distance between the processed first thermogram and the processed second thermogram.

8. The method of claim 1, further comprising the step of determining the first thermogram and/or second thermogram by calorimetry.

9. The method of claim 8, wherein the step of determining the first thermogram and/or second thermogram comprises performing a differential scanning microcalorimetry measurement.

10. The method of claim 1, wherein the first and second sample comprise a candidate biopharmaceutical.

11. The method of claim 1, wherein the degree of similarity is a degree of biosimilarity.

12. The method of claim 1, wherein determining a degree of similarity from a correlation operation comprises weighting a result of the correlation operation by a degree of similarity between values of a physical parameter determined from the first thermogram and second thermogram.

13. The method of claim 12, wherein the physical parameter is selected from: a state transition temperature, a state transition enthalpy, and a state transition cooperativity.

14. The method of claim 13, wherein the state transition is: a melting point, a denaturation point or a folding/unfolding temperature.

15. The method of claim 1, wherein determining a degree of similarity from a correlation operation comprises exponentiating a result of the correlation operation.

16. A machine readable non-transient storage medium, comprising instructions for configuring a computer to perform the method of claim 1.

17. A differential scanning calorimeter operable to obtain a thermogram from a sample, comprising:
   a sample cell,
   a reference cell,
   a thermal shield disposed around the sample cell and the reference cell,
   a cell heater arranged to heat the sample cell and the reference cell,
   a thermal sensor arranged to measure a difference in temperature between the sample cell and the reference cell, and
   a processing system configured to control the cell heater and receive temperature measurements from the sample cell and reference cell, and to determine a first thermogram comprising estimates of heat capacity at each of a range of temperatures for a test substance in the sample cell, the estimates being responsive to a difference in the amount of heat required to maintain the sample cell and reference cell at the same temperature while the temperature of both the sample cell and reference cell is varied,
   wherein the processing system comprises a memory for storing a second thermogram, and the processing system is configured to compare the first thermogram with the second thermogram, by:
   determining a smoothed first thermogram and a smoothed second thermogram by respectively performing a smoothing operation on the first thermogram and the second thermogram;
   determining a processed first thermogram and a processed second thermogram by respectively finding a derivative of the smoothed first thermogram and the smoothed second thermogram;
   determining the degree of similarity from a correlation operation comparing the processed first thermogram with the processed second thermogram.

* * * * *